United States Patent
Neher et al.

(10) Patent No.: US 12,498,153 B2
(45) Date of Patent: Dec. 16, 2025

(54) DISTRIBUTOR MODULE FOR A REFRIGERANT CIRCUIT

(71) Applicant: Robert Bosch GmbH, Stuttgart (DE)

(72) Inventors: Denis Neher, Remchingen (DE); Dana Nicgorski, Burlington, MA (US); Thomas Holzer, Karlsbad (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 18/506,344

(22) Filed: Nov. 10, 2023

(65) Prior Publication Data

US 2024/0159436 A1   May 16, 2024

(30) Foreign Application Priority Data

Nov. 14, 2022   (DE) .................. 10 2022 212 036.1

(51) Int. Cl.
*F25B 43/00* (2006.01)
*F25B 13/00* (2006.01)
*F25B 41/31* (2021.01)

(52) U.S. Cl.
CPC ............ *F25B 43/006* (2013.01); *F25B 13/00* (2013.01); *F25B 41/31* (2021.01)

(58) Field of Classification Search
None
See application file for complete search history.

(56) References Cited

U.S. PATENT DOCUMENTS

| 6,668,569 | B1* | 12/2003 | Jin | F25B 13/00 62/509 |
|---|---|---|---|---|
| 2011/0083468 | A1 | 4/2011 | Bellenfant et al. | |
| 2023/0204119 | A1* | 6/2023 | Oh | F16K 31/041 137/625 |

FOREIGN PATENT DOCUMENTS

| DE | 10151480 A1 | 5/2002 |
|---|---|---|
| KR | 20130029871 A | 3/2013 |

* cited by examiner

*Primary Examiner* — Miguel A Diaz
(74) *Attorney, Agent, or Firm* — Michael Best & Friedrich LLP

(57) ABSTRACT

A distributor module includes a housing having first and second refrigerant inlets and first and second refrigerant outlets for connection to a compressor and a condenser-evaporator device. A heat exchanger and a shutoff valve are arranged within the housing. The heat exchanger is connected to the refrigerant inlets and refrigerant outlets such that heat from a refrigerant flowing between the first refrigerant inlet and the first refrigerant outlet and between the second refrigerant inlet and the second refrigerant outlet can be exchanged. The shutoff valve is connected to the second refrigerant inlet and the heat exchanger. A refrigerant connector is connected to the second refrigerant inlet on a shutoff valve inlet side. A further refrigerant connector is connected to the heat exchanger on a shutoff valve outlet side. At least one refrigerant subcircuit is formed between the refrigerant connectors, and sections of the subcircuit are arranged within the housing.

9 Claims, 2 Drawing Sheets

DISTRIBUTOR MODULE FOR A REFRIGERANT CIRCUIT

BACKGROUND

The present invention relates to a distributor module for a refrigerant circuit, a refrigerant circuit with a distribution module, and a vehicle comprising a refrigerant circuit having a distribution module.

Coolant and refrigerant systems are known from the prior art. The installation of such a system means that a large number of mechanical and hydraulic interfaces have to be provided. In addition, a great deal of effort is required for mechanical and electrical component integration and for establishing communication.

SUMMARY

The object of the present invention is to provide a distributor module for a refrigerant circuit, a refrigerant circuit comprising a distributor module, and a vehicle comprising a refrigerant circuit having a distributor module. Said object is achieved by means of a distributor module for a refrigerant circuit, a refrigerant circuit having a distributor module, and a vehicle having a refrigerant circuit having a distributor module.

A distributor module for a refrigerant circuit comprises a housing having a first and a second refrigerant inlet and a first and a second refrigerant outlet, an internal heat exchanger arranged within the housing, and a shutoff valve arranged within the housing. The first refrigerant inlet and the second refrigerant outlet are provided for connecting the distributor module to a compressor of the refrigerant circuit. The first refrigerant outlet and the second refrigerant inlet are provided for connecting the distributor module to a condenser-evaporator device of the refrigerant circuit. The internal heat exchanger is connected to the refrigerant inlets and the refrigerant outlets such that heat of a refrigerant flowing between the first refrigerant inlet and the first refrigerant outlet and between the second refrigerant inlet and the second refrigerant outlet can be exchanged. The shutoff valve is connected to the second refrigerant inlet and the internal heat exchanger. A first refrigerant connector is connected to the second refrigerant inlet on the shutoff valve inlet side. A second refrigerant connector is connected to the internal heat exchanger on the shutoff valve outlet side. At least one refrigerant subcircuit is formed between the first and second refrigerant connectors. The refrigerant subcircuit is arranged at least in sections within the housing.

The distributor module is based on the idea of providing a refrigerant circuit and any given coolant circuits coupled thereto, at least in sections within the housing. Advantageously, the use of the distributor module reduces the effort required to install the refrigerant circuit, as the number of mechanical, electrical and hydraulic components and interfaces to be installed is reduced, as these components and interfaces are already installed in the distributor module. This can also reduce the length of lines that carry the refrigerant and optionally other lines that carry coolant from coolant circuits that are thermally coupled to the refrigerant circuit, and lengths of electrical lines. This can make it possible to reduce temperature losses and pressure losses during operation of the refrigerant circuit, as a result of which the refrigerant circuit can be operated more efficiently. The more components or sections of the refrigerant circuit are arranged within the housing, the greater the degree of integration of the distributor module, the easier it is to install the refrigerant circuit and the more efficiently it can be operated.

In one embodiment, a cooling device is arranged within the housing and connected to the first refrigerant connector and to the second refrigerant connector, as a result of which a first refrigerant subcircuit is completely arranged within the housing. The housing comprises a coolant inlet and a coolant outlet. The cooling device is connected to the coolant inlet and the coolant outlet. As a result, heat from a coolant flowing between the coolant inlet and the coolant outlet is able to be transferred to the refrigerant flowing between the first refrigerant connector and the second refrigerant connector. Advantageously, the cooling device can, e.g., be used to cool a vehicle battery, and is integrated into the distributor module.

In one embodiment, the housing comprises a third refrigerant inlet and a third refrigerant outlet for connecting the distributor module to an evaporator. The third refrigerant outlet is connected to the first refrigerant connector and the third refrigerant inlet is connected to the second refrigerant connector. As a result, sections of a second refrigerant subcircuit are arranged within the housing. The second refrigerant subcircuit can advantageously be used for cooling in order to, e.g., operate a vehicle air conditioning system of which the evaporator is a component.

In one embodiment, the cooling device and the third refrigerant inlet are connected to the second refrigerant connector, as a result of which the first refrigerant subcircuit and the second refrigerant subcircuit share a common line section. Advantageously, the overall length of the refrigerant circuit or its lines is thereby reduced.

In one embodiment, a first valve is integrated into the first refrigerant subcircuit and arranged within the housing and between the first refrigerant connector and the cooling device and/or a second valve is integrated into the second refrigerant subcircuit and arranged within the housing and between the first refrigerant connector and the third refrigerant outlet. Advantageously, the first and second refrigerant subcircuits can thereby be controlled separately. Arranging the valves within the housing of the distributor module also increases the degree of integration of the distributor module.

In one embodiment, an internal condenser is arranged within the housing. The housing comprises a further coolant inlet and a further coolant outlet. The internal condenser is connected to the other coolant inlet and the other coolant outlet. The internal condenser is connected to the first refrigerant inlet and the internal heat exchanger, as a result of which heat can be transferred from the refrigerant flowing between the first refrigerant inlet and the internal heat exchanger to a further coolant flowing between the further coolant inlet and the further coolant outlet. Advantageously, heat can as a result be transferred from the refrigerant to the other coolant. This heat can, e.g., be used to heat an air conditioning system, such as a vehicle air conditioning system.

In one embodiment, a choke valve is arranged within the housing and connected to the internal heat exchanger and the first refrigerant outlet. Advantageously, the degree of integration of the distributor module is further increased by incorporating additional components of the refrigerant circuit.

A refrigerant circuit comprises a distributor module according to one of the embodiments, a compressor, and a condenser-evaporator device. The first refrigerant inlet and the second refrigerant outlet are connected to the compressor of the refrigerant circuit. The first refrigerant outlet and the second refrigerant inlet are connected to the condenser-evaporator device of the refrigerant circuit.

A vehicle comprises a refrigerant circuit with a distributor module according to one of the embodiments.

BRIEF DESCRIPTION OF THE DRAWINGS

The distributor module is explained in detail in the following description in conjunction with schematic drawings. Shown are.

DETAILED DESCRIPTION

Figure 1:
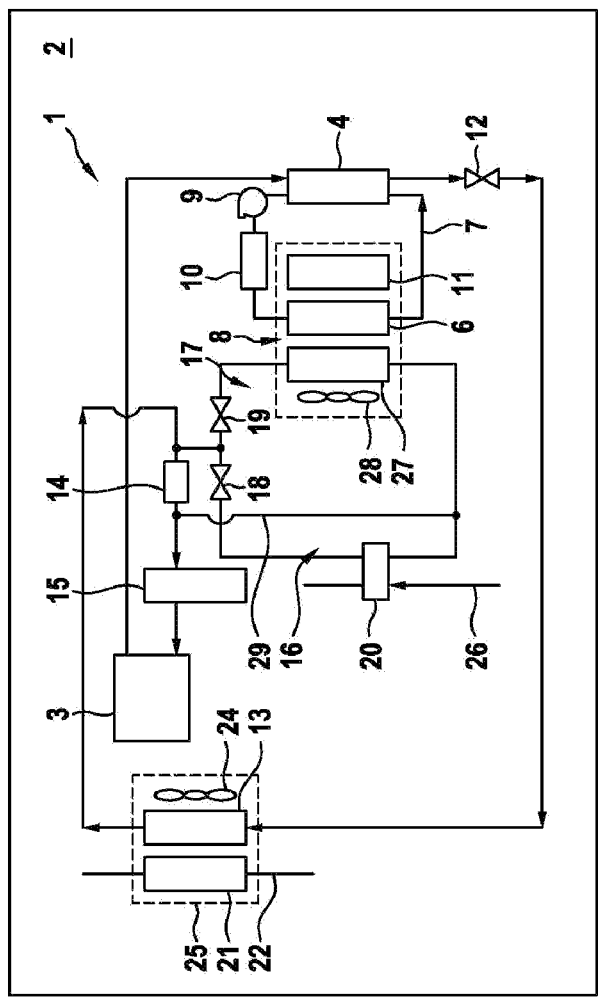
FIG. 1: a refrigerant circuit according to the prior art and
FIG. 2 a distributor module.

FIG. 1 schematically shows elements of a known refrigerant circuit 1. The refrigerant circuit 1 can, e.g., be an integral part of a vehicle 2. The refrigerant circuit 1 is intended to convey a refrigerant, e.g., Propan or $CO_2$, through lines and components of the refrigerant circuit 1, whereby a state of the refrigerant is changed, as a result of which the refrigerant is able to absorb and release heat. As a result, absorbed heat or released heat can be used for targeted cooling or heating.

The refrigerant circuit 1 comprises a compressor 3. The compressor 3 is designed to compress the refrigerant in a gaseous state, whereby the temperature of the refrigerant increases as well as the pressure. The refrigerant circuit 1 also comprises an internal condenser 4, which is connected to the compressor 2. The internal condenser 4 is designed to liquefy the refrigerant compressed by compressor 2, whereby the refrigerant gives off heat and cools down.

The heat emitted at the internal condenser 4 can, e.g., be used for an air conditioning system 5, e.g. an air conditioning system 5 of the vehicle 2. FIG. 1 shows, by way of example, an air conditioning system 5 with a radiator 6, which is connected to the internal condenser 4 via a first coolant circuit 7. As a result, heat at the internal condenser 4 is able to be transferred from the refrigerant to a first coolant of the first coolant circuit 7. The heat can, e.g., be transferred to a vehicle interior of the vehicle 2 via the radiator 6. For this purpose, the air conditioning system 5 can comprise an air valve 8, which enables convection and circulation of air in order to remove heat from the radiator 6.

The first coolant circuit 7 comprises a pump 9 so that the first coolant of the first coolant circuit 7 can circulate. The pump 9 is (merely by way of example) connected between the radiator 6 and the internal condenser 4. The first coolant circuit 7 also comprises a heating element 10 for preheating the coolant. The heating element 10 is arranged in the first coolant circuit 7, by way of example between the pump 9 and the radiator 6 of the air conditioning system 5. The heating element 10 can, e.g., be designed as a PTC cooling and heating element. Cooling elements feature a positive temperature coefficient (PTC). The air conditioning system 5 also comprises an optional additional heating element 11 for preheating the air. The additional heating element 11 can, e.g., also be designed as a PTC cooling and heating element. The heating element 10 and/or the additional heating element 11 can already heat the vehicle interior before heat is transferred from the refrigerant circuit 1 to the first coolant circuit 7.

The refrigerant circuit 1 comprises a choke valve 12. The choke valve 12 is connected to the internal condenser 4. The choke valve 12 is designed as an expansion valve and is designed to allow the refrigerant liquefied by the internal condenser 4 to expand, as a result of which it to cools. The choke valve 12 is used for expansion when the internal condenser 4 of the refrigerant circuit 1 is to supply heat. In this operating mode, the refrigerant circuit 1 is a heat pump. However, if the refrigerant is intended to be used for cooling, e.g. to cool a battery in vehicle 2, the choke valve 12 is fully open and does not perform an expansion function.

The refrigerant circuit 1 comprises a condenser-evaporator device 13, which is connected to the choke valve 12. Depending on the operating mode, the condenser/evaporator device 13 is designed to evaporate or condense the refrigerant. In heat pump mode, the condenser-evaporator device 13 is intended to evaporate the refrigerant expanded at the choke valve 12. In cooling mode, the condenser-evaporator device 13 is intended to condense the refrigerant. In this case, condensation need not necessarily occur on the internal condenser 4. The extent to which the condenser-evaporator device 13 modifies the state of the refrigerant depends on the state of the refrigerant after it has passed the choke valve 12.

A heat exchanger 21 can be arranged in the region of the condenser-evaporator device 13. The heat exchanger 21 can, e.g., be designed as a radiator. FIG. 1 shows, by way of example, the case in which the heat exchanger 21 is designed to transfer heat from the refrigerant to a second coolant of a schematically indicated second coolant circuit 22 for cooling a component, e.g. a component of the vehicle 2. Furthermore, a fan 24 can be arranged in the region of the condenser-evaporator device 13 in order to conduct heat away from the condenser-evaporator device 13 and, e.g., into the vehicle interior of the vehicle 2. The condenser-evaporator device 13, the heat exchanger 21 and the fan 24 can also be referred to together as a CRFM module 25 (condenser radiator fan module). If the condenser-evaporator device 13 is used to evaporate the refrigerant during heat pump operation, then it can be used for cooling, e.g., cooling the second coolant by transferring heat from the second coolant to the refrigerant.

The compressor 3, the internal condenser 4, the choke valve 12 and the condenser-evaporator device 13 are connected in series and form a circuit. The condenser-evaporator device 13 is therefore connected to the compressor 3, but not directly. The connection of the condenser-evaporator device 13 to the compressor 3 again depends on the operating mode of the refrigerant circuit 1. For this reason, the refrigerant circuit 1 comprises a shutoff valve 14, the position of which determines the operating state. The shutoff valve 14 is connected to the condenser-evaporator device 13 and the compressor 3 or is connected between the condenser-evaporator device 13 and the compressor 3.

During heat pump operation of the refrigerant circuit 1, the refrigerant evaporated at the condenser-evaporator device 13 must be supplied to the compressor 3. In this case, the shutoff valve 15 is open. An accumulator 15 is arranged in the refrigerant circuit 1 between the shutoff valve 14 and the compressor 3. The accumulator 15 is designed to evaporate non-evaporated refrigerant residues, as a result of which the refrigerant is only provided to the compressor 3 in a gaseous state. This protects the compressor 3 and extends its service life. During heat pump operation, the refrigerant is then compressed again and supplied to the internal condenser 4.

In cooling mode, however, the shutoff valve 14 is closed. This makes it possible to provide at least one refrigerant subcircuit 16, 17 that bypasses the shutoff valve 14. The at least one refrigerant subcircuit 16, 17 is thus connected to the condenser/evaporator device 13 and the compressor 3 or the optional accumulator 15. FIG. 1 shows, by way of example, two refrigerant subcircuits 16, 17, each of which bypasses the shutoff valve 14. The refrigerant subcircuits 16, 17 are connected in parallel. In order to be able to use the refrigerant subcircuits 16, 17 separately or simultaneously, the refrigerant circuit 1 comprises a first valve 18 and a second valve 19, which are each connected to the condenser-evaporator device 13 on the shutoff valve input side. By opening the first valve 18, a first refrigerant subcircuit 16 can be used. A second refrigerant subcircuit 17 can be used by opening the second valve 18. The first and/or the second valve 18, 19 can, e.g., be designed as expansion valves.

The first refrigerant subcircuit 16 of the refrigerant circuit 1 comprises a cooling device 20. The cooling device 20 is connected to the first valve 18 and the compressor 3 or the accumulator 15. The cooling device 20 is intended to transfer heat to the refrigerant liquefied in cooling mode at the condenser/evaporator device 13 from a third coolant of a third coolant circuit 26, whereby the refrigerant evaporates and is made available again in gaseous state to the compressor 3 or the accumulator 15. A component, e.g. a component of the vehicle 2, such as a battery, can as a result be cooled by transferring heat generated during operation of the battery first to the third coolant circuit 26 and then to the first refrigerant subcircuit 16.

The second refrigerant subcircuit 17 of the refrigerant circuit 1 comprises an evaporator 27. The evaporator 27 is connected to the second valve 19 and the compressor 3 or the accumulator 15. The evaporator 27 is also an integral part of the air conditioning system 5 of the vehicle 2. The vehicle interior can be cooled by evaporating the refrigerant at the evaporator 27 of the air conditioning system 5. The air conditioning system 5 comprises a further fan 28, which is intended to remove warm or cool air (e.g., convey the conditioned air into the vehicle interior). The evaporated refrigerant is in turn supplied to the compressor 3 or the accumulator 15.

FIG. 1 shows, merely by way of example, that the first and second refrigerant subcircuits share a common line section 29. The common line section 29 is in the region between the cooling device 20 and the compressor 3 or the accumulator 15 or in the region between the evaporator 27 of the air conditioning system 5 and the compressor 3 or the accumulator 15. However, this is not absolutely necessary. The refrigerant subcircuits 16, 17 need not necessarily comprise common line sections.

The present invention is based on the idea of providing a distributor module 30 for a refrigerant circuit 1 according to FIG. 1, which comprises at least parts of the refrigerant circuit 1, as a result of which an assembly effort of the refrigerant circuit 1 or the vehicle 2 can be reduced, since clamps, brackets, screws, hydraulic interfaces, seals, lines for the refrigerant, and optionally at least one coolant etc. are already preassembled integral parts of the distributor module 30. As a result, the occurrence of leaking interfaces can be reduced or prevented. Line sections of the refrigerant circuit 1 can be reduced by terminating a distributor module 30, as a result of which undesirable pressure losses and thermal losses can be reduced. This can improve the efficiency of the refrigerant circuit 1.

Figure 2:
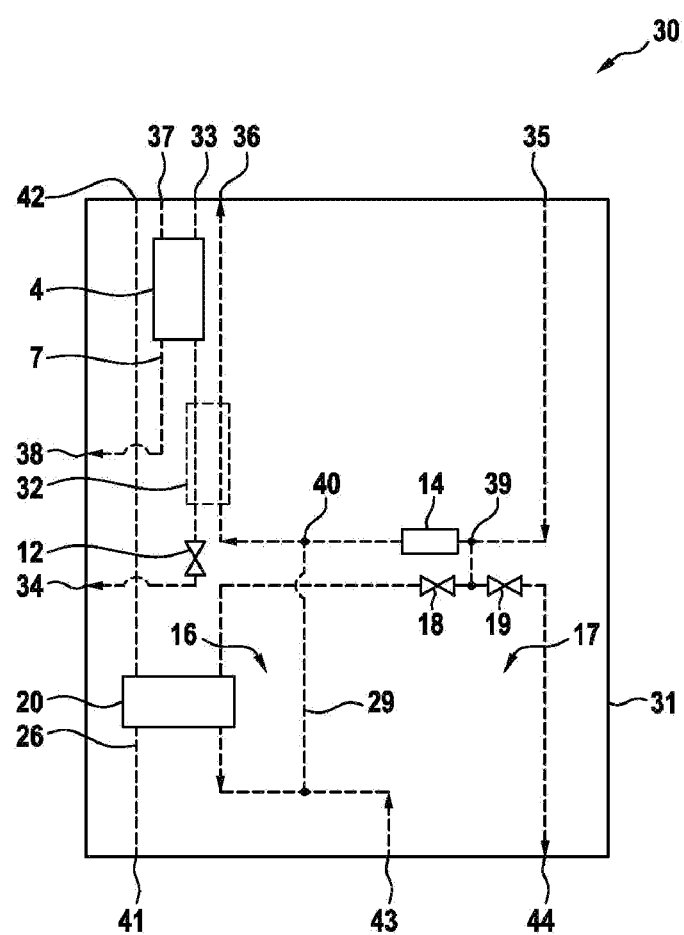

FIG. 2 schematically shows a distributor module 30 for a refrigerant circuit 1 according to an exemplary embodiment. The distributor module 30 comprises parts of the refrigerant circuit 1, which are arranged in a housing 31. Similar or identical elements are marked with the same reference signs as in FIG. 1.

The housing 31 can, e.g., be made of aluminum. However, the housing 31 can also be made of a different metallic material, a plastic, or another material. An internal heat exchanger 32 and the shutoff valve 14 are arranged within the housing 31. However, all other components of the refrigerant circuit 1 shown arranged within the housing 31 in FIG. 2 need not necessarily be arranged within the housing 31, i.e., apart from the internal heat exchanger 32 and the shutoff valve 14, all other components, specifically the internal condenser 4, the choke valve 12, the first valve 18, the second valve 19, and the cooling device 20 need not be arranged individually within the housing 31, or need not be integral parts of the distributor module 30. However, at least one refrigerant subcircuit 16, 17 is formed between the first and the second refrigerant connector 39, 40, at least sections of which are arranged within the housing 31. However, the more components of the coolant circuit 1 the coolant distributor module 30 comprises, the easier it is to assemble the coolant circuit 1 or the vehicle 2, and the more efficiently the coolant circuit 1 can be operated.

The housing 31 of the distributor module 30 comprises a first refrigerant inlet 33, a second refrigerant inlet 35, a first refrigerant outlet 34, and a second refrigerant outlet 36. The first refrigerant inlet 33 is provided for connecting the distributor module 30 to the compressor 3 of the refrigerant circuit 1. In this exemplary embodiment of the distributor module 30, the internal condenser 4 is an integral part of the distributor module 30 and is arranged within the housing 31. The internal condenser 4 is connected between the first refrigerant inlet 33 and the internal heat exchanger 32. If the internal condenser 4 is not integral part of the distributor module 30 and is arranged outside the housing 31, then the first refrigerant inlet 33 is provided for indirect connection of the distributor module 30 to the compressor 3 via the internal condenser 4 of the refrigerant circuit 1. In short, in this case the first refrigerant inlet 33 is provided for direct connection of the distributor module 30 to the internal condenser 4.

However, if the internal condenser 4 is arranged within the housing 31, then at least part of the first coolant circuit 7 must also be arranged within the housing 31. For this reason, the housing 31 in FIG. 2 comprises a first coolant inlet 37 and a first coolant outlet 38. The internal condenser 4 is connected to the first coolant inlet 37 and the first coolant outlet 38. In this way, heat can be transferred from the refrigerant flowing between the first refrigerant inlet 33 and the internal heat exchanger 32 to the first coolant of the first coolant circuit 7 flowing between the first coolant inlet 37 and the second coolant outlet 38.

The first refrigerant outlet 34 is provided for connecting the distributor module 30 to the condenser/evaporator device 13 of the refrigerant circuit 1 in FIG. 1. In the exemplary embodiment of the distributor module 30 in FIG. 2, the choke valve 12 is also an integral part of the distributor module 30 and is arranged within the housing 31. The choke valve 12 is connected to the first refrigerant outlet 34 and the internal heat exchanger 32 and is connected in between. However, if the choke valve 12 is not integral part of the distributor module 30 and is arranged outside the housing 31, then the first refrigerant outlet 34 is only provided for indirect connection of the distributor module 30 to the condenser-evaporator device 13 via the choke valve 12 of the refrigerant circuit 1. In this case, the first refrigerant outlet 34 is provided for direct connection of the distributor module 30 to the choke valve 12.

The second refrigerant inlet 35 is also provided for connecting the distributor module 30 to the condenser-evaporator device 13. The second refrigerant outlet 36 is again provided for connecting the distributor module 30 to the compressor 3, as a result of which the refrigerant circuit 1 is closed. The internal heat exchanger 32 is connected to the first refrigerant inlet 33, the second refrigerant inlet 35, the first refrigerant outlet 34 and the second refrigerant outlet 36 such that heat of the refrigerant flowing between the first refrigerant inlet 33 and the first refrigerant outlet 34 and between the second refrigerant inlet 35 and the second refrigerant outlet 36 can be exchanged. In this way, during heat pump operation, residual heat from the condensed refrigerant provided by the internal condenser 4 can be used and transferred to a section of the refrigerant circuit 1, within which the refrigerant is transported in a gaseous state to the compressor 3 or to the accumulator 15. As a result, the residual heat of the refrigerant does not have to be released into the environment, as a result of which the design scope when installing the distributor module 30 or the refrigerant circuit 1 is increased.

The shutoff valve 14 is connected between the second refrigerant inlet 35 and the internal heat exchanger 32. The shutoff valve 14 is open during heat pump operation. As a result, refrigerant vaporized by the condenser/evaporator device 13 is able to be transported to the compressor 3 or accumulator 15 via the internal heat exchanger 32

When the shutoff valve 14 is closed, the first and/or second refrigerant subcircuit 16, 17 can be operated. At least sections of the first and/or the second refrigerant subcircuit 16, 17 are arranged within the housing 31 of the distributor module 30. For this purpose, a first refrigerant connector 39 is connected to the second refrigerant inlet 35 on the shutoff valve input side. A second refrigerant connector 40 is connected to the internal heat exchanger 32 on the shutoff valve outlet side. At least one refrigerant subcircuit 16, 17 is formed between the first and second refrigerant connectors 39, 40. FIG. 2 shows, by way of example, that the first refrigerant subcircuit 16 is arranged completely within the housing 31 of the distributor module 30, whereas only sections of the second refrigerant subcircuit 17 are arranged within the housing 31. However, it is also possible that the first refrigerant subcircuit 16 is only partially arranged within the housing 31. This is the case if the cooling device 20 is not an integral part of the coolant distributor module 30 and is arranged outside the housing 31, in contrast to the exemplary illustration in FIG. 2. It is also possible that the second refrigerant subcircuit 17 is completely arranged within the housing 31. In contrast to the illustration in FIG. 2, the evaporator 27 must be arranged inside the housing 31 and also be integral part of the distributor module 30.

As just mentioned, the cooling device 20 in FIG. 2 is arranged within the housing 31 by way of example. The cooling device 20 is connected to the first refrigerant connector 39 and to the second refrigerant connector 40. In other words, the cooling device 20 is connected on the shutoff valve inlet side to the second refrigerant inlet 35 and on the shutoff valve outlet side to the internal heat exchanger 32, as a result of which the first refrigerant subcircuit 16 bypasses the shutoff valve 14 and is completely arranged within the housing 31.

Since the cooling device 20 is integral part of the distributor module 30 and is arranged within the housing 31, at least one section of the third coolant circuit 26 must also be arranged within the housing 31. For this purpose, the housing 31 comprises a first coolant inlet 41 and a first coolant outlet 42. The cooling device 20 is connected to the first coolant inlet 41 and the first coolant outlet 42. As a result, heat from the third coolant flowing between the first coolant inlet 41 and the first coolant outlet 42 is able to be transferred to the refrigerant flowing between the first refrigerant connector 39 and the second refrigerant connector 41.

In addition to (by way of example) the first refrigerant subcircuit 16, sections of the second refrigerant subcircuit 17 are, by way of example, arranged within the housing 31. For this purpose, the housing 31 comprises a third refrigerant inlet 43 and a third refrigerant outlet 44 for connecting the distributor module 30 to an evaporator, e.g. the evaporator 27 of the air conditioning system 5 of the refrigerant circuit 1. The third refrigerant outlet 44 is connected to the first refrigerant connector 39, and the third refrigerant outlet 43 is connected to the second refrigerant connector 40. At the third refrigerant outlet 44, the refrigerant provided by the condenser-evaporator device 13, which enters the distributor module 30 via the second refrigerant inlet 35 and flows to the third refrigerant outlet 44 via the first refrigerant connector 39, can be provided to the evaporator 27. Vaporized refrigerant can be fed back into the housing 31 at the third refrigerant inlet 43.

Since in the exemplary embodiment in FIG. 2 at least sections of the first and the second refrigerant subcircuits 16, 17 are each arranged within the housing 31 of the distributor module 30, it is possible to also integrate the first and the second valves 18, 19 into the housing 31 of the distributor module 30 and to arrange them within the housing 31. The first valve 18 is connected to the first refrigerant connector 39 and the cooling device 20, or is connected between the first refrigerant connector 39 and the cooling device 20. The second valve 19 is connected to the first refrigerant connector 39 and the third refrigerant outlet 44 or connected in between.

Similarly, by way of example, the first refrigerant subcircuit 16 and the second refrigerant subcircuit 17 share the common line section 29. This is made possible by the fact that the cooling device 20 and the third refrigerant inlet 43 are each connected to the second refrigerant connector 40, which is not absolutely necessary, as a result of which the overall line length of the refrigerant circuit 1 is reduced. Furthermore, only a second refrigerant connector 40, which is arranged on the shutoff valve outlet side and connected to the internal heat exchanger 32, is thereby required. Conversely, it is possible that separate first refrigerant connectors 39 are arranged on the shutoff valve inlet side for the first and second refrigerant subcircuits 16, 17 and are connected to the second refrigerant inlet 35.

The distributor module 30 can also be expanded to include other components used in the refrigerant circuit 1 and not shown in FIGS. 1 and 2, e.g., pumps, valves, electric heaters, or expansion tanks and electrical components for, e.g., controlling valves. The degree of integration is further increased by adding temperature, pressure, or pressure-temperature sensors to each hydraulic inlet and/or outlet 33, 34, 35, 36, 37, 38, 41, 42, 43, 44 of the distributor module 30. This increases the advantages described above, namely savings in wire and line length of the refrigerant circuit 1 and optionally of coolant circuits 7, 22, 26, of connectors as well as the effort involved in programming the vehicle control unit.

The invention claimed is:

1. A distributor module (30) for a refrigerant circuit (1), comprising a housing (31) having a first and a second refrigerant inlet (33, 35), and a first and a second refrigerant outlet (34, 36), an internal heat exchanger (32) arranged within the housing (31), and a shutoff valve (14) arranged within the housing (31), wherein the first refrigerant inlet (33) and the second refrigerant outlet (36) are provided for connecting the distributor module (30) to a compressor (3) of the refrigerant circuit (1), wherein the first refrigerant outlet (34) and the second refrigerant inlet (35) are provided for connecting the distributor module (30) to a condenser-evaporator device (13) of the refrigerant circuit (1), wherein the internal heat exchanger (32) is connected to the refrigerant inlets (33, 35) and the refrigerant outlets (34, 36) such that heat of a refrigerant flowing between the first refrigerant inlet (33) and the first refrigerant outlet (34) and between the second refrigerant inlet (35) and the second refrigerant outlet (36) can be exchanged, wherein the shutoff valve (14) is connected to the second refrigerant inlet (35) and the internal heat exchanger (32), wherein a first refrigerant connector (39) is connected to the second refrigerant inlet (35) on a shutoff valve inlet side, wherein a second refrigerant connector (40) is connected to the internal heat exchanger (32) on a shutoff valve outlet side, wherein at least one refrigerant subcircuit (16, 17) is formed between the first and the second refrigerant connector (39, 40), wherein at least sections of the refrigerant subcircuit (16, 17) are arranged within the housing (31).

2. The distributor module (30) according to claim 1,
wherein a cooling device (20) is arranged within the housing (31) and connected to the first refrigerant connector (39) and the second refrigerant connector (40), as a result of which, a first refrigerant subcircuit (16) of the at least one refrigerant subcircuit (16, 17) is completely arranged within the housing (31),
wherein the housing (31) comprises a coolant inlet (41) and a coolant outlet (42),
wherein the cooling device (20) is connected to the coolant inlet (41) and the coolant outlet (42),
as a result of which, heat from a coolant flowing between the coolant inlet (41) and the coolant outlet (42) can be transferred to the refrigerant flowing between the first refrigerant connector (39) and the second refrigerant connector (40).

3. The distributor module (30) according to claim 2,
wherein the housing (31) comprises a third refrigerant inlet (43) and a third refrigerant outlet (44) for connecting the distributor module (30) to an evaporator (27),
wherein the third refrigerant outlet (44) is connected to the first refrigerant connector (39), and the third refrigerant inlet (43) is connected to the second refrigerant connector (40), as a result of which, sections of a second refrigerant subcircuit (17) of the at least one refrigerant subcircuit (16, 17) are arranged within the housing (31).

4. The distributor module (30) according to claim 3,
wherein the cooling device (20) and the third refrigerant inlet (43) are connected to the second refrigerant connector (40),
as a result of which, the first refrigerant subcircuit (16) and the second refrigerant subcircuit (17) share a common line section (29).

5. The distributor module (30) according to claim 4,
wherein a first valve (18) is integrated into the first refrigerant subcircuit (16) and arranged within the housing (31) between the first refrigerant connector (39) and the cooling device (20), and/or a second valve (19) is integrated into the second refrigerant subcircuit (17) and arranged within the housing (31) between the first refrigerant connector (39) and the third refrigerant outlet (44).

6. The distributor module (30) according to claim 1,
wherein an internal condenser (4) is arranged within the housing (31),
wherein the housing (31) comprises a further coolant inlet (37) and a further coolant outlet (38),
wherein the internal condenser (4) is connected to the further coolant inlet (37) and the further coolant outlet (38),
wherein the internal condenser (4) is connected to the first refrigerant inlet (33) and the internal heat exchanger (32), as a result of which, heat from the refrigerant flowing between the first refrigerant inlet (33) and the internal heat exchanger (32) can be transferred to a further coolant flowing between the further coolant inlet (37) and the further coolant outlet (38).

7. The distributor module (30) according to claim 1,
wherein a choke valve (12) is arranged within the housing (31) and connected to the internal heat exchanger (32) and the first refrigerant outlet (34).

8. A refrigerant circuit (1) having a distributor module (30) according to claim 1, comprising the compressor (3) and the condenser/evaporator device (13),
wherein the first refrigerant inlet (33) and the second refrigerant outlet (36) are connected to the compressor (3),
wherein the first refrigerant outlet (34) and the second refrigerant inlet (35) are connected to the condenser-evaporator device (13).

9. A vehicle (2) comprising a refrigerant circuit (1) according to claim 8.

* * * * *